United States Patent [19]

Mila

[11] 3,851,311

[45] Nov. 26, 1974

[54] ARRANGEMENT AND METHOD FOR PROTECTING A COMMON HIGHWAY FROM FALSE SIGNALS

[75] Inventor: Truman R. Mila, Batavia, Ill.

[73] Assignee: GTE Automatic Electric Laboration Incorporated, Northlake, Ill.

[22] Filed: Sept. 17, 1973

[21] Appl. No.: 398,299

[52] U.S. Cl. ....................... 340/147 R, 179/175.2 C

[51] Int. Cl. ......................... H04m 3/22, H04q 9/00

[58] Field of Search .... 340/147; 179/15 AE, 15 BF, 179/175.2 C, 18 C, 27 G

[56] References Cited

UNITED STATES PATENTS

| | | | |
|---|---|---|---|
| 3,351,721 | 11/1967 | Voegtlen et al. | 179/18 C |
| 3,400,228 | 9/1968 | Bubber | 179/175.2 C |
| 3,597,544 | 8/1971 | Kennedy | 179/18 C |
| 3,624,305 | 11/1971 | Verbaas | 179/175.2 C |

*Primary Examiner*—Donald J. Yusko

[57] ABSTRACT

An arrangement and method for protecting a common highway from false signals as a result of, for example, a ground fault on a lead between a matrix and a service circuit, by providing a timer within the service circuit having a time cycle which is less than the cycle time of the system's marker which interrogates the service circuit. The identity of the service circuit is thus coupled onto the common highway during the timer's time cycle until it times out.

4 Claims, 3 Drawing Figures

ARRANGEMENT AND METHOD FOR PROTECTING A COMMON HIGHWAY FROM FALSE SIGNALS

This invention relates to an improved centralized automatic message accounting system. More particularly, it relates to an arrangement and method for protecting a common highway within the system from false signals.

In the hereinafter described centralized automatic message accounting system, an end marking matrix scheme is used. This makes it advantageous for the marker to deal with the inlet and outlet numbers of the matrix, rather than the identities of the trunks and service circuits, that is, the receivers and senders, connected to the inlets and outlets. The system's call processor, however, must have the receiver and/or sender identity in order to communicate with these devices. It, therefore, is necessary for the system's marker, while making a matrix connection, to interrogate the service circuit and obtain its identity number. This is accomplished by means of a DC signal which is sent from the matrix outlet, via the pull device associated with the outlet, to the associate service circuit. This signal activates a network within the service circuit which then provides, on a common highway, the tens and units identity of the associated service circuit.

An inherent problem with this type of an arrangement is that a ground fault on the lead between the matrix outlet and the service circuit can result in a permanent indication on the common highway. One manner in which to overcome a permanent signal on the common highway is to provide means for remembering the previous state of the common highway, however, such means are costly.

Accordingly, it is an object of the present invention to provide an arrangement and method for protecting a common highway in such a system from false signals.

More particularly, it is an object to provide an arrangement and method for protecting the common highway over which the service circuit identities are sent, from permanent signals caused by ground faults from the matrix pull devices.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

DESCRIPTION OF THE INVENTION

Figure 1:
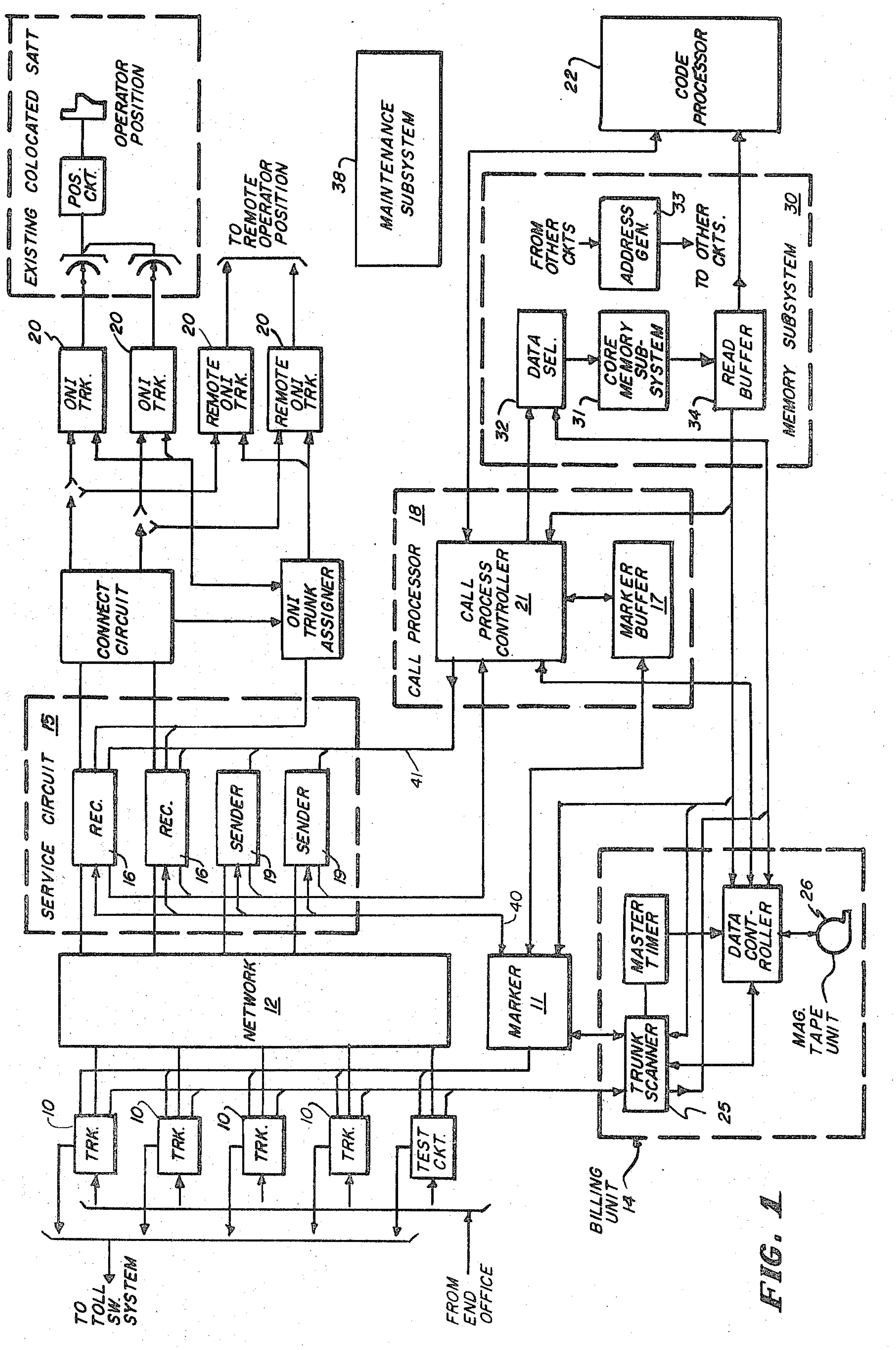
FIG. 1 is a block diagram schematic of the centralized automatic message accounting system.

Referring now to the drawings, in FIG. 1 the centralized automatic message accounting system is illustrated in block diagram, and the functions of the principal equipment elements can be generally described as follows. The trunks 10, which may be either multifrequency (MF) trunks or dial pulse (DP) trunks, provide an interface between the originating office, the toll switching system, the marker 11, the switching network 12, and the billing unit 14. The switching network 12 consists of three stages of matrix switching equipment between its inlets and outlets. A suitable distribution of links between matrices are provided to insure that every inlet has full access to every outlet for any given size of the switching network. The three stages, which consist of A, B and C crosspoint matrices, are interconnected by AB and BC links. The network provides a minimum of 80 inlets, up to a maximum of 2,000 inlets and 80 outlets. Each inlet extends into an A matrix and is defined by an inlet address. Each outlet extends from a C matrix to a terminal and is defined by an outlet address.

Each full size network is divided into a maximum of 25 trunk grids on the inlet side of the network and a service grid with a maximum of 16 arrays on the outlet side of the network. The trunk grids and service grid within the networks are interconnected by the BC link sets of 16 links per set. Each MF trunk grid is provided for 80 inlets. Each DP trunk grid is provided for 40 inlets. The service grid is provided for a maximum of 80 outlets. A BC link is defined as the interconnection of an outlet of a B matrix in a trunk grid and an inlet of a C matrix in the service grid.

The marker 11 is the electronic control for establishing paths through the electromechanical network. The marker constantly scans the trunks for a call for service. When the marker 11 identifies a trunk with a call for service, it determines the trunk type, and establishes a physical connection between the trunk and a proper receiver 16 in the service circuits 15.

The trunk identity and type, along with the receiver identity, are temporarily stored in a marker buffer 17 in the call processor 18 which interfaces the marker 11 and the call processor 18.

When the call processor 18 has stored all of the information transmitted from a receiver, it signals the marker 11 that a particular trunk requires a sender 19. The marker identifies an available sender, establishes a physical connection from the trunk to the sender, and informs the call processor 18 of the trunk and sender identities.

The functions of the receivers 16 are to receive MF 2/6 tones or DP signals representing the called number, and to convert them to an electronic 2/5 output and present them to the call processor 18. A calling number is received by MF 2/6 tones only. The receivers will also accept commands from the call processor 18, and interface with the ONI trunks 20.

The function of the MF senders are to accept commands from the call processor 18, convert them to MF 2/6 tones and send them to the toll switch.

The call processor 18 provides call processing control and, in addition, provides temporary storage of the called and calling telephone numbers, the identity of the trunk which is being used to handle the call, and other necessary information. This information forms part of the initial entry for billing purposes in a multi-entry system. Once this information is passed to the billing unit 14, where a complete initial entry is formated, the call will be forwarded to the toll switch for routing.

The call processor 18 consists of the marker buffer 17 and a call processor controller 21. There are 77 call stores in the call processor 18, each call store handling one call at a time. The call processor 18 operates on the 77 call stores on a time-shared basis. Each call store has a unique time slot, and the access time for all 77 call stores is equal to 39.4 MS, plus or minus 1 percent.

The marker buffer 17 is the electronic interface between the marker 11 and the call processor controller 21. Its primary functions are to receive from the marker 11 the identities of the trunk, receiver or sender, and the trunk type. This information is forwarded to the appropriate call store.

The operation of the call process controller revolves around the call store. The call store is a section of memory allocated for the processing of a call, and the call process controller 21 operates on the 77 call stores sequentially. Each call store has eight rows and each row consists of 50 bits of information. The first and second rows are repeated in rows 7 and 8, respectively. Each row consists of two physical memory words of 26 bits per word. Twenty-five bits of each word are used for storage of data, and the 26th bit is a parity bit.

The call processor controller 21 makes use of the information stored in the call store to control the progress of the call. It performs digit accumulation and the sequencing of digits to be sent. It performs fourth digit 0/1 blocking on a 6 or 10 digit call. It interfaces with the receivers 16, the senders 19, the code processor 22, the billing unit 14, and the marker buffer 17 to control the call.

The main purpose of the code processor 22 is to analyze call destination codes in order to perform screening, prefixing and code conversion operations of a nature which are originating point dependent. This code processing is peculiar to the needs of direct distance dialing (DDD) originating traffic and is not concerned with trunk selection and alternate routing, which are regular translation functions of the associated toll switching machine. The code processor 22 is accessed only by the call processor 18 on a demand basis.

The billing unit 14 receives and organizes the call billing data, and transcribes it onto magnetic tape. A multi-entry tape format is used, and data is entered into tape via a tape transport operating in a continuous recording mode. After the calling and called director numbers, trunk identity, and class of service information is checked and placed in storage, the billing unit 14 is accessed by the call process controller 21. At this time, the call record information is transmitted into the billing unit 14 where it is formated and subsequently recorded on magnetic tape. The initial entry will include the time. Additional entries to the billing unit 14 contain answer and disconnect information.

The trunk scanner 25 is the means of conveying the various states of the trunks to the billing unit 14. The trunk scanner 25 is connected to the trunks by a highway extending from the billing unit 14 to each trunk. Potentials on the highway leads will indicate states in the trunks.

Each distinct entry (initial, answer, disconnect) will contain a unique entry identity code as an aid to the electronic data processing (EDP) equipment in consolidating the multi-entry call records into toll billing statements. The billing unit 14 will provide the correct entry identifier code. The magnetic tape unit 26 is comprised of the magnetic tape transport and the drive, storage and control electronics required to read and write data from and to the nine channel billing tape. The read function will allow the tape unit to be used to update the memory.

The recorder operates in the continuous mode at a speed of 5 inches per second, and a packing density of 800 bits per inch. Billing data is recorded in a multi-entry format using a nine bit EBCDIC character (extended binary coded decimal interchange code). The memory subsystem 30 serves as the temporary storage of the call record, as the permanent storage of the code tables for the code processor 22, and as the alterable storage of the trunk status used by the trunk scanner 25.

The core memory 31 is composed of ferrite cores as the storage elements, and electronic circuits are used to energize and determine the status of the cores. The core memory 31 is of the random access, destructive readout type, 26 bits per word with 16 K words.

For storage, data is presented to the core memory data registers by the data selector 32. The address generator 33 provides the address or core storage locations which activate the proper read/write circuits representing one word. The proper clear/write command allows the data selected by the data selector 32 to be transferred to the core storage registers for storage into the addressed core location.

For readout, the address generator 33 provides the address or core storage location of the word which is to be read out of memory. The proper read/restore command allows the data contained in the word being read out, to be presented to the read buffer 34. With a read/restore command, the data being read out is also returned to core memory for storage at its previous location.

The method of operation of a typical call in the system, assuming the incoming call is via an MF trunk can be described as follows. When a trunk circuit 10 recognizes the seizure from the originating office, it will provide an off-hook to the originating office and initiate a call-for-service to the marker 11. The marker 11 will check the equipment group and position scanners to identify the trunk that is requesting service. Identification will result in an assignment of a unique four digit 2/5 coded equipment identity number. Through a trunk-type determination, the marker 11 determines the type of receiver 16 required and a receiver/sender scanner hunts for an idle receiver 16. Having uniquely identified the trunk and receiver, the marker 11 makes the connection through the three-stage matrix switching network 12 and requests the marker buffer 17 for service.

The call-for-service by the marker 11 is recognized by the marker buffer 17 and the equipment and receiver identities are loaded into a receiver register of the marker buffer 17. The marker buffer 17 now scans the memory for an idle call store to be allocated for processing the call, under control of the call process controller 21. Detection of an idle call store will cause the equipment and receiver identities to be dumped into the call store. At this time, the call process controller 21 will instruct the receiver 16 to remove delay dial and the system is now ready to receive digits.

Upon receipt of a digit, the receiver 16 decodes that digit into 2/5 code and times the duration of digit presentation by the calling end. Once it is ascertained that the digit is valid, it is presented to the call processor 18 for a duration of no less than 50 milliseconds of digit and 50 milliseconds of interdigital pause for storage in the called store. After receipt of "ST," the call processor controller 21 will command the receiver 16 to instruct the trunk circuit 10 to return an off-hook to the calling office, and it will request the code processor 22.

The code processor 22 utilizes the called number to check for EAS blocking and other functions. Upon completion of the analysis, the code processor 22 will send to the call processor controller 21 information to route the call to an announcement or tone trunk, at up to four prefix digits if required, or provide delete information pertinent to the called number. If the call processor controller 21 determined that the call is an ANI call, it will receive, accumulate and store the calling number in the same manner as was done with the called number. After the call process controller 21 receives "ST," it will request the billing unit 14 for storage of an initial entry in the billing unit memory. It will also command the receiver 16 to drop the trunk to receiver connection. The call processor controller 21 now initiates a request to the marker 11 via the marker buffer 17 for a trunk to sender connection. Once the marker 11 has made the connection and has transferred the identities to the marker buffer 17, the marker buffer will dump this information into the appropriate call store. The call processor controller 21 now interrogates the sender 19 for information that delay dial has been removed by the routing switch (crosspoint tandem or similar). Upon receipt of this information the call processor controller 21 will initiate the sending of digits including "KP" and "ST." The call process controller 21 will control the duration of tones and interdigital pause. After sending of "ST," the call processor 18 will await the receipt of the matrix release signal from the sender 19. Receipt of this signal will indicate that the call has been dropped. At this time, the sender and call store are returned to idle, ready to process a new call.

The initial entry information when dumped from the call store is organized into the proper format and stored in the billing unit memory. Eventually, the call answer and disconnect entries will also be stored in the billing unit memory. The initial entry will consist of approximately 40 characters and trunk scanner 25 entries for answer or disconnect contain approximately 20 characters. These entries will be temporarily stored in the billing unit memory until a sufficient number have been accumulated to comprise one data block of 1,370 characters. Once the billing unit memory is filled, the magnetic tape unit 26 is called and the contents of the billing unit memory is recorded onto the magnetic tape.

The final result of actions taken by the system on a valid call will be a permanent record of billing information stored on magnetic tape in multi-entry format consisting of initial, answer, and disconnect or forced disconnect entries.

Answer timing, force disconnect timing and other timing functions such as, for example, a "grace period" timing interval on answer, in the present system, are provided by the trunk timers. These trunk timers are memory timers, and an individual timer is provided for each trunk in a trunk scanner memory which comprises a status section and a test section.

The status section contains one word per ticketed trunk. Each word contains status, instruction, timing and sequence information. The status section also provides one word per trunk group which contains the equipment group number, and an equipment position tens word that identifies the frame. A fully equipped status section requires 2,761 words of memory representing 2,000 trunks spread over 60 groups plus a status section "start" word. As each status word is read from memory, it is stored in a trunk scanner read buffer (not shown). The instruction is read by a scanner control to identify the contents of the word. The scanner control logic acts upon the timing, sequence and status information, and returns the updated word to the trunk scanner memory and it is written into it for use during the next scanner cycle.

The test section contains a maximum of 83 words: a start word, a last programmed word, 18 delay words, two driver test words, 1 end-test word and one word for each equipment group. The "start test" word causes a scan point test to begin. The delay words allow time for scan point filters to charge before the trunk groups are scanned, with the delay words containing only instructional data. The equipment group words contain a two digit equipment group identity and five trunk frame equipped bits. The trunk frame equipped bits (one per frame) indicates whether or not a frame exists in the position identified by its assigned bit. The delay words following the equipment group allow the scan point filters to recharge before the status section of memory is accessed again for normal scanning. The Last Program word inhibits read and write in the trunk scanner memory until a trunk scanner address generator has advanced through enough addresses to equal the scanner cycle time. When the cycle time expires, the trunk scanner address generator returns to the start of the status section of memory and normal scanning recommences.

The trunk scanner memory and the trunk scanner read buffer are not part of the trunk scanner 25, however, the operation thereof is controlled by a scanner control which forms a part of the trunk scanner 25 of the billing unit 14. The trunk scanner 25 maintains an updated record of the status of each ticketed trunk, determines from this status when a billing entry is required, and specifies the type of entry to be recorded. The entry includes the time it was initiated and the identification of its associated trunk.

Scanning is performed sequentially, by organizing the memory in such a manner that when each word is addressed, the trunk assigned to that address is scanned. This causes scanning to progress in step with the trunk scanner address generator. During the address advance interval, the next scanner word is addressed and, during the read interval, the word is read from memory and stored in the trunk scanner read buffer. At this point, the trunk scanner 25 determines the operations to be performed by analyzing the word instruction.

As indicated above, scanning is performed sequentially. If all trunks in all groups are scanned in numerical sequence beginning with trunk 0000, scanning would proceed in the following manner:

Step 1

Trunk 0000 located in frame 00 (lineup 0, column 0) in the top file, leftmost card position would be scanned first.

Step 2

All trunks located in frame 00 and the leftmost card position would be scanned next from the top file to the bottom.

Step 3

Scanning advances to frame 01 (lineup 0, column 1) and proceeds as in Step 2.

Step 4

Scanning proceeds as in step 3 until frame 04 has been scanned.

Step 5

The scanner returns to frame 00 and Step 2 is repeated for the next to leftmost card position.

Step 6

The sequence just described continues until all ten card positions in all five columns have been examined.

Step 7

The entire process is repeated in lineups 1 through 5.

When a memory word instruction identifies a trunk group word, the status receivers are cleared to prepare for scanning the trunks specified in the group word. The trunk group digits stored in the trunk scanner read buffer (TSRB) are transferred into the equipment group register.

After the trunk group number is decoded, it is transformed into binary code decimals (BCD), processed through a 1-out-of-N check circuit, and applied to the AC bus drivers (ACBD). The drivers activate the scan point circuits via the group leads and the trunk status is returned to the receivers.

A group address applied to the drivers causes the status of all trunks in 1 lineup and 1 card position and all columns to be returned to the receivers. The group tens digit specifies the trunk frame lineup and the group units digit identifies the card slot.

When a status word is read from memory, it sets the previous count of a trunk timer (TT) into the trunk timer.

If the trunk is equipped and the forced disconnect sequence equals 2 (FDS=2), a request to force release the trunk is transmitted to the marker 11. If FDS does not equal 2, the present condition of the ticketing contacts in the trunk is tested. If the instruction indicates that the trunk is in an updated condition (the trunks associated memory word was reprogrammed) it is tested for idle. If the trunk is idle, its instruction is changed to denote that it is ready for new calls. If the trunk is not idle, no action is taken and the trunk scanner 25 proceeds to the next trunk.

If the trunk is not in the updated condition and FDS=3, the trunk is tested for idle. If the trunk is idle, FDS is set to 0 and TT is reset.

If FDS does not equal 3 and a match exists between the present contact status and the previous contact status stored in memory (bits 5 and 6) the FDS memory bits are inspected for a count equal to 1. If FDS=1, TT is reset and the memory contact status is updated. If FDS does not equal 1, TT is not reset.

During any analysis of a trunk status, a change in the contact configuration of a trunk is not considered valid until it has been examined twice.

One bit (SFT) is provided in each memory status word to indicate whether or not a change in status of the trunk was detected during the previous scan cycle.

When a change in status is detected, SFT is set to 1. If SFT=1 on the next cycle, the status is analyzed and SFT is set to 0.

If a mismatch exists between the present contact condition and that previously stored in memory, the status has changed and a detailed examination of the status is started.

If CT=1, the trunk is busy and so the previous condition of the contact is inspected. If the trunk previously was idle, CM=0. Before continuing the analysis, it must be determined if this is the first indication of change in the trunk status by examining the "second look" bit (SFT). If SFT=0, it is set to equal 1, and the analysis of this trunk status is discontinued until the next scanner cycle. If SFT=1, the memory status is updated and SFT is set to equal 0.

If CT=1, the trunk is cut through and CM is inspected to determine if the memory status was updated. If CM=1, the GT contact status must differ from GM since it was already determined that a mismatch exists. If GT=0, answer has not occurred. If GT=1, and this condition existed during the previous scan cycle, SFT=1 also. If these conditions are true and FDS does not equal 1, TT is advanced and answer timing begins. If these conditions persist for eight scanner cycles (approximately 1 second), answer is confirmed and an entry will be stored in the trunk scanner formater (TSF). If answer is aborted (possibly hookswitch fumble) before the 1 second answer time (time is adjustable) expires, TT remains at its last count. When the answer condition returns, answer timing continues from the last TT count. Thus, answer timing is cumulative.

After an answer entry is stored, which includes the TT count, TT is reset, SFT is set to 0, and the new contact status is written into memory.

If a mismatch exists and CT=0, the previous state of this contact is inspected by examining bit 5 in the trunk scanner read buffer (TSRB). If CM=1, the state of the terminating end of the trunk is tested. If GT=1, then the condition of the trunk has just changed from answer to disconnect. If this condition existed during the previous scan cycle, SFT=1 and a disconnect entry is stored in the TSF.

After the disconnect entry is stored, which includes the TT count, TT is reset, FDS and SFT are set to 0, and the new status is written into memory.

If a mismatch exists and the originating end of a trunk is not released, both CT and CM equals 1. If GT=0 after the previous scan cycle, FDS is tested. If this change just occurred, FDS does not equal 1. Since FDS does not equal 1, it will be set equal to 1 and TT will reset. FDS=1 indicates that forced disconnect timing is in progress.

While the conditions just described exist, i.e., mismatch, CT=1, CM=1, GT=0 and FDS=1, TT will advance one count during each scanner cycle, if one half second has elapsed since the last scan cycle. TT will continue to advance until it reaches a count of 20 (approximately 10 seconds) when a force disconnect entry will be stored in the TSF.

When the entry is stored, FDS is set at 2 indicating that the trunk is to be force released. After the entry is stored, which includes the TT count, TT is reset, SFT is set to 0, and the new status is written into memory.

After the status and test sections of the memory have been accessed, the Last Program word is read from memory and stored in the trunk scanner read buffer. This word causes read/write in the trunk scanner portion of memory to be inhibited and deactivates the scan point test. The trunk scanner address generator will continue to advance, however, until sufficient words have been addressed to account for one scan cycle. When a predetermined address, the Last Address, is reached, block read/write is removed and the address generator returns to the Start Address (First Program Word) of the scanner memory.

More particularly, as indicated above, when a call enters the system by way of a trunk 10, the marker 11 will recognize the call for service signal from this trunk, and attempt to connect an idle receiver 16 to this trunk by way of the matrix or network 12. First, the marker 11 will scan for an idle receiver 16, then pull a matrix path between this idle receiver and the trunk after a continuity test and foreign potential check have been satisfied. The matrix path, as indicated above, is pulled by an end marking scheme. Once a path is pulled, the receiver 16 will hold the trunk 10 until the receiver is told to release the matrix by the call processor 18, or until the call has been abandoned by the originator.

During the setting up of the matrix path, the marker provides the receiver 16 with the trunk type information for control of receiving either DP or MF, and the receiver 16 will provide the marker 11 with its service circuit identity (receiver address). The marker 11 then forwards the receiver address, trunk type and equipment identity (matrix inlet associated with this trunk) to the call processor 18. The call processor 18 will use the receiver address to interrogate the receiver 16 to collect the called and calling digits, or commands from the receiver 16. The call processor also uses the receiver address to present commands to the receiver. Information to the call processor 18 is encoded in 2/5 plus 1/2 code; information from the call processor 18 is encoded in 2/5 code. The receiver is equipped to receive both MF and DP.

The circuitry and manner in which the above-described operations are accomplished is generally disclosed and described in the following copending application:

Serial No: 357,310
Filed: May 4, 1973
By: Melvin A. Jacobs now U.S. Pat. No. 3,825,701, issued July 23, 1974

Reference may be made to this copending application for a more detailed explanation of the operation. However, for the purpose of the present invention, the operation is important only to the extent of understanding the sequence of operation in establishing the described connections and that certain control signals are used in doing so, with the invention being concerned with protecting the common highway over which the receiver identity or address is sent from false signals.

The marker 11 while making a matrix connection between a trunk 10 and a receiver 16 interrogates the latter to obtain its identity, by means of a DC signal which is sent from the matrix outlet, via the pull device associated with the outlet, to the associated receiver 16. This signal then activates a network within the receiver 16 which then provides the tens and units identity of the receiver 16 to the call processor 18, via a common highway.

Figure 2A:
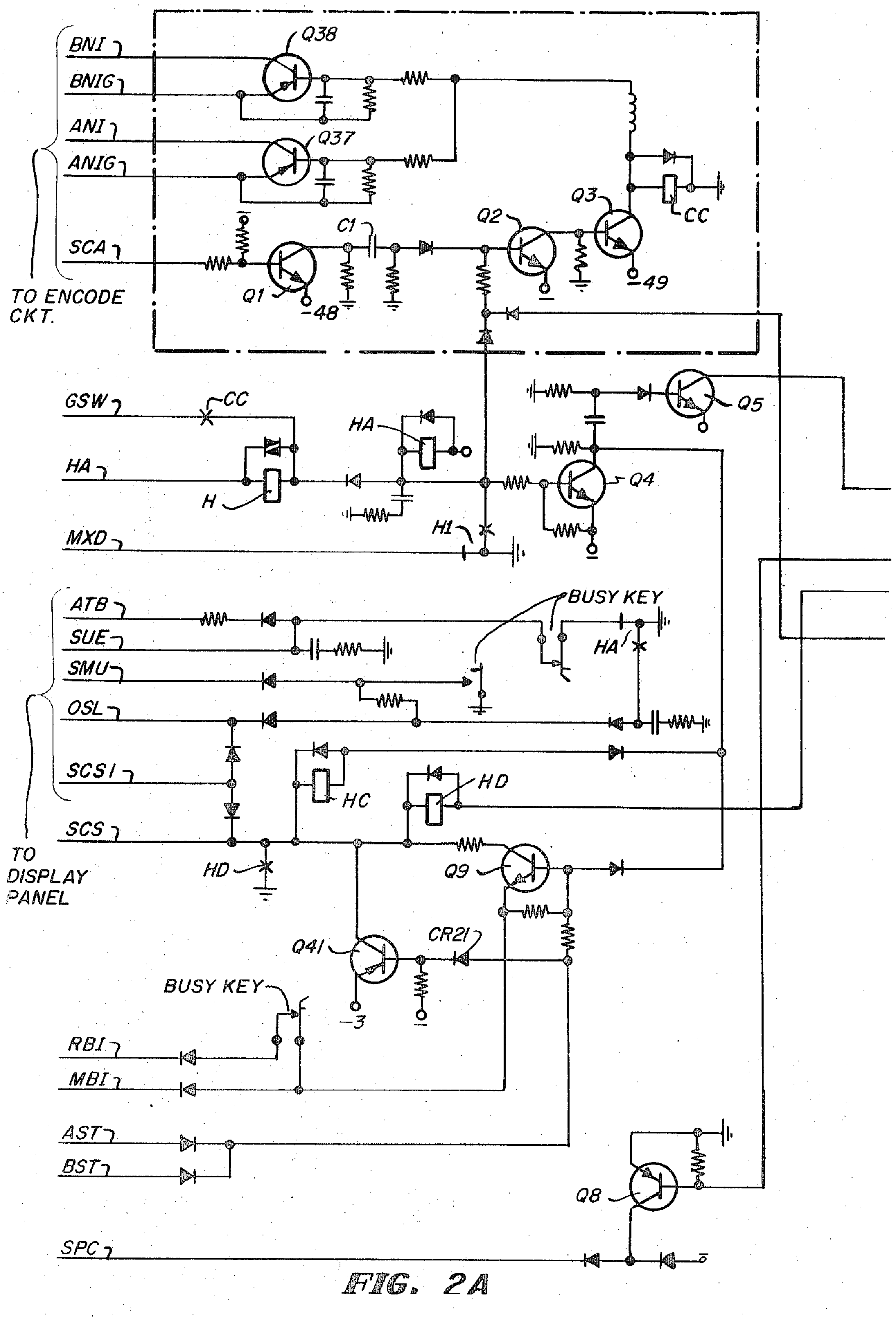
FIGS. 2A and 2B is a partial schematic illustration of one of the system's receivers.
Figure 2B:
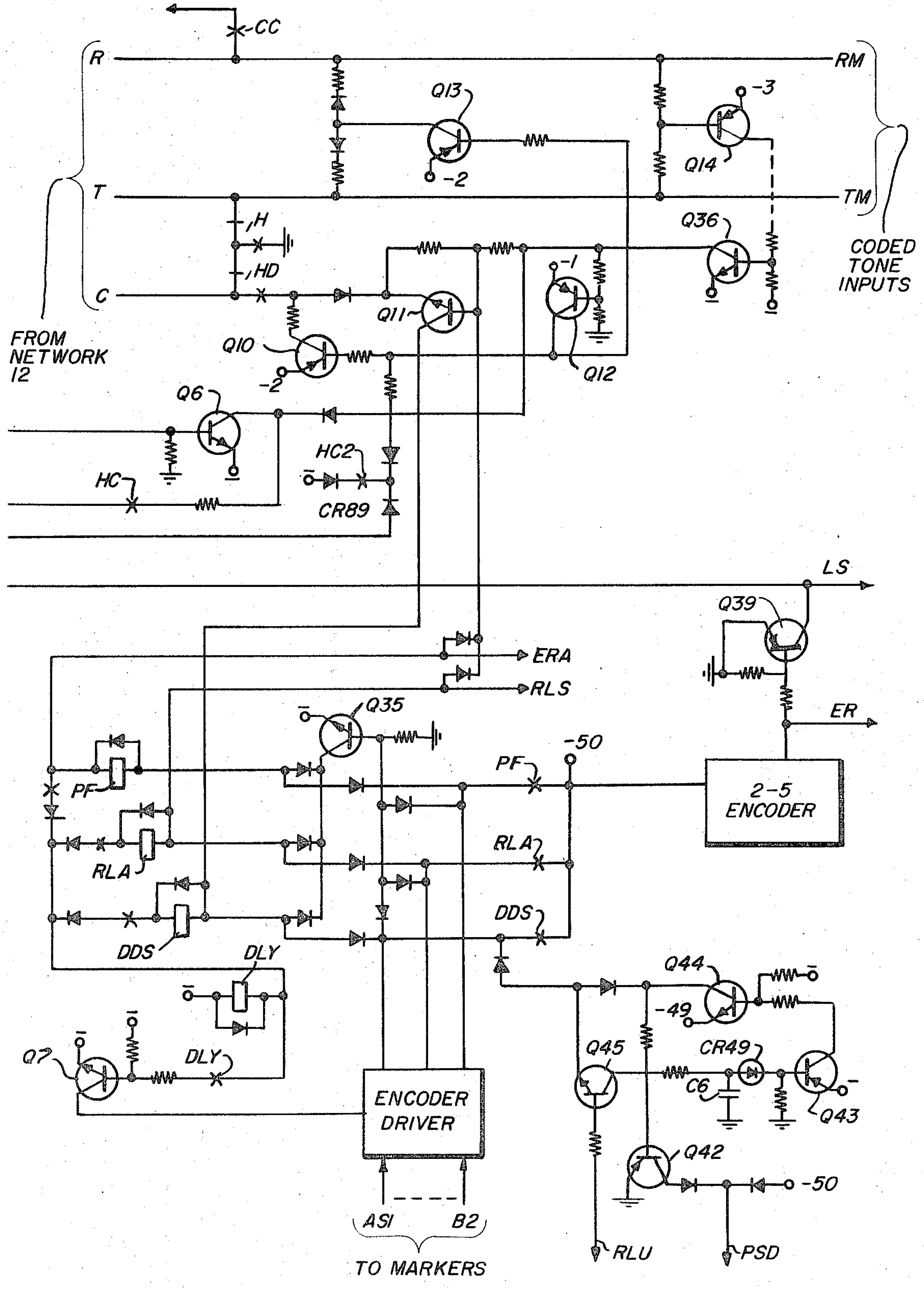

Referring now to FIGS. 2A and 2B wherein one of the receivers 16 is shown. The leads as shown on these figures corresponds to the leads of FIG. 1 as indicated below: lead HA the matrix hold lead, transmission leads T and R and control lead C and lead SCS indicating the busy-idle states of the network correspond to the leads between each of the service circuits and the network. Lead GSW indicating to the service circuit to take control of the matrix, MXD indicating that the matrix has released, RBI indicating normal busy-idle status, MBI indicating maintenance busy-idle status, AST and BST leads over which the A and B markers request the busy-idle status, and leads ASI to B2 the digit command highways to both markers A and B via highway 40 of FIG. 1.

Leads RM, TM the two transmissions leads, LS, ER, ERO and VA are from other parts of the sender circuit not shown which check the 2–5 tone signals for valid combinations as well as to indicate the type of signalling to be used.

Leads ATB the busy lead, SUE sender usage, SMU sender maintenance usage, OSL out-of-service lamp, SCS1 sender external busy key, SPC sender peg count and PSD peg count for sender delay all go to the sender display panel and external traffic measurement devices timer comprising the transistors Q1, Q2 and Q3 has been added whose time ratio is such that a DC signal from the matrix outlet will provide an identification on the common highway between the receiver 16 and the call processor 18 for a time period just slightly less than the inherent cycle time of the associated marker. The use of this scheme now provides protection from a permanent fault on the common highway, as this fault can now exist only during the time required to connect one path to the matrix. By allowing a retry within the marker, should a ground fault cause an incorrect output on the common highway during the original matrix pull attempt, the service circuit timer (transistors Q1, Q2 and Q3) will remove this fault before the marker completes its retry allowing the marker to detect a usable number on the retry.

More specifically, assume that the marker 11 while making a matrix connection between a trunk 10 and a receiver 16 interrogates the latter to obtain its identity. This is done by means of a DC signal (a ground) on lead SCA which would be in the cable 40 of FIG. 1. This ground signal causes transistor Q1 to turn ON and, in doing so, the voltage on capacitor C1 is shifted, causing the transistor Q2 to turn OFF. The transistor Q2 remains OFF until the capacitor C1 partially discharges, and while OFF, it allows the transistor Q3 to turn ON. The transistor Q3, in turn, turns ON transistors Q37 and Q38 which provide outputs via leads BNI, BNIG, ANI and ANIG to the dual frame sensing cards SC1 and SC2 which function to output the receiver's identification number out onto the common highway 41 to the call processor 18.

If, at the time the receiver 16 is interrogated by the marker 11, another receiver 16 is falsely triggered by a fault to output its identification number out onto the common highway, the marker 11 will reject the information, for it will receive too much information, that is, two sets of identification numbers, and it will recycle and retry, in accordance with its normal mode of operation. The timer within the receiver 16 which is falsely outputting its identification number now will have timed out, that is, the capacitor C1 has discharged to permit transistor Q2 to again turn ON which, in turn, turns OFF transistors Q3, Q37 and Q38. The permanent ground on the lead SCA holds the transistor Q1 ON so that the voltage on the capacitor C1 cannot be shifted to again turn OFF the transistor Q2, and hence the fault is effectively removed before the marker 11 retries for the identification. During the retry cycle, the receiver 16 again is interrogated and this time only its receiver identification number will be outputted, in the manner described above, allowing the marker 11 to detect a usable number.

Accordingly, from the above description, it can be seen that the arrangement permits a fault condition to exist only during a period slightly less than the marker's cycle time, until the receiver's timer times out. In the illustrated embodiment, the cycle time of the marker is approximately 14 milliseconds and the receiver's timer times out after approximately 10–12 milliseconds.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a common control communication switching system including a plurality of trunks connectable through a switching network to any one of a number of service circuits under the control of a marker, the marker during its cycle time and upon establishing a connection between a trunk and a service circuit coupling an interrogate signal to the latter to interrogate it for its identification number, the identification number being coupled to a common highway for transmission to a call processor within the system, the marker upon failing to properly receive an identification number reinterrogating the service circuit during its next cycle of operation, an arrangement for overcoming a permanent identification signal on said common highway as a result of a permanent fault signal corresponding to said interrogate signal on the connection between said switching network and a service circuit comprising a timer within each of said service circuits having a pre-established time cycle which is less than the cycle time of said marker and activated when said marker couples said interrogate signal to said service circuit to cause the identification number of said service circuit to be provided on said common highway during its time cycle, said permanent fault signal activating a timer within one of said service circuits and thereby causing said identification number of said service circuit to be coupled onto said common highway during said timer's time cycle until said timer times out, said timer upon timing out being prevented from being re-activated until said permanent fault signal is removed; whereby a permanent fault signal will cause the identification number of a service circuit to appear on the common highway only for a time period less than the cycle time of the marker.

2. In a common control communication system, the arrangement of claim 1, wherein said interrogate signal comprises a ground signal.

3. In a common control communication system, the arrangement of claim 1, wherein said timers in each of said service circuits each comprises a first, a second and a third transistor and a capacitor in the coupling between said first and second transistors, said first transistor being rendered conductive upon receipt of said interrogate signal or a permanent fault signal corresponding to said interrogate signal and shifting the voltage on said capacitor to thereby render said second transistor non-conductive until said capacitor partially discharges, said second transistor in being rendered non-conductive permitting said third transistor to be conductive, said third transistor being conductive causing the service circuits identification number to be coupled onto said common highway.

4. In a common control communication switching system including a plurality of trunks connectable through a switching network to any one of a number of service circuits under the control of a marker, the marker during its cycle time and upon establishing a connection between a trunk and a service circuit coupling an interrogate signal to the latter to interrogate it for its identification number, the identification number being coupled to a common highway for transmission to a call processor within the system, the marker upon failing to properly receive an identification number reinterrogating the service circuit during its next cycle of operation, a method for overcoming a permanent identification signal on said common highway as a result of a permanent fault signal corresponding to said interrogation signal on the connection between said switching network and a service circuit comprising the steps of providing within each of said service circuits a timer which has a pre-established time cycle less than the cycle time of said marker and which is activated when said marker couples said interrogate signal to said service circuit, said timer upon being activated causing the identification number of said service circuit to be provided on said common highway during its time cycle, said timers upon being activated by a permanent fault signal causing said identification numbers to be coupled onto said common highway during said timer's time cycle and upon timing out being prevented from being re-activated until said permanent fault signal is removed; whereby a permanent fault signal will cause the identification number of a service circuit to appear on the common highway only for a time period less than the cycle time of the marker.

* * * * *